United States Patent
Kakegawa (10) Patent No.: US 7,049,362 B2
(45) Date of Patent: May 23, 2006

(54) RESIN MOLDED PRODUCT

(75) Inventor: Hiroya Kakegawa, Osaka (JP)

(73) Assignee: Osaka Gas Co.,Ltd., Osaka (JP)

( * ) Notice: Subject to any disclaimer, the term of this patent is extended or adjusted under 35 U.S.C. 154(b) by 0 days.

(21) Appl. No.: 09/869,262

(22) PCT Filed: Nov. 1, 1999

(86) PCT No.: PCT/JP99/06090

§ 371 (c)(1),
(2), (4) Date: Jun. 27, 2001

(87) PCT Pub. No.: WO00/40642

PCT Pub. Date: Jul. 13, 2000

(65) Prior Publication Data

US 2005/0004269 A1    Jan. 6, 2005

(30) Foreign Application Priority Data

Dec. 28, 1998 (JP) ................................. 10-373203
Dec. 28, 1998 (JP) ................................. 10-373270
Jun. 4, 1999 (WO) ........................... PCT/JP/03027

(51) Int. Cl.
*C08K 3/04* (2006.01)
(52) U.S. Cl. ..................... 524/495; 524/496; 422/907
(58) Field of Classification Search ................ 524/495, 524/496; 422/907
See application file for complete search history.

(56) References Cited

U.S. PATENT DOCUMENTS

| 4,467,200 A | | 8/1984 | Kalwar et al. |
| 5,026,463 A | * | 6/1991 | Dinter et al. ............... 204/164 |
| 5,571,472 A | | 11/1996 | Shiraiwa |
| 5,599,591 A | | 2/1997 | Shiraiwa |
| 5,858,472 A | | 1/1999 | Iwata et al. |

FOREIGN PATENT DOCUMENTS

| EP | 055686 | 7/1982 |
| EP | 0675505 | 10/1995 |
| EP | 0732706 | 9/1996 |
| EP | 0764663 | 3/1997 |
| JP | 56166039 | 12/1981 |
| JP | A56-166039 | 12/1981 |
| JP | 57119931 | 7/1982 |
| JP | 60229944 | 11/1985 |
| JP | 60229952 | 11/1985 |
| JP | 62110917 | 5/1987 |
| JP | 6353017 | 3/1988 |
| JP | 3296537 | 12/1991 |
| JP | A3-296537 | 12/1991 |
| JP | 4146936 | 5/1992 |
| JP | 6215618 | 8/1994 |
| JP | A6-215618 | 8/1994 |
| JP | 7268124 | 10/1995 |
| JP | A7-268124 | 10/1995 |
| JP | 873655 | 3/1996 |
| JP | A8-73655 | 3/1996 |
| JP | 8253606 | 10/1996 |
| JP | A8-253606 | 10/1996 |
| JP | 987403 | 3/1997 |
| JP | A9-87403 | 3/1997 |

* cited by examiner

*Primary Examiner*—Edward J. Cain
(74) *Attorney, Agent, or Firm*—Birch,Stewart,Kolasch & Birch, LLP (57) ABSTRACT

A resin molded product is provided which exhibits a higher level of electrical conductivity and particularly a lower level of surface resistance than those generally expected from the content of an electrically conductive filler. The resin molded product comprises a matrix of a resin material and an electrically conductive filler dispersed in the matrix, wherein a content of the electrically conductive filler is lower than 20 wt %, and the resin molded product has been subjected to a voltage application process employing a voltage of not lower than 20 kV and lower than a dielectric breakdown voltage of the matrix. The electrically conductive filler is, for example, a fibrous filler such as a fibrous carbon filler or a fibrous graphite filler, and has an average fiber diameter of, for example, 0.002 to 15 μm. The resin molded product typically contains a coloring material dispersed in the matrix together with the electrically conductive filler, and exhibits a color corresponding to the coloring material.

22 Claims, 6 Drawing Sheets

RESIN MOLDED PRODUCT

This application is the national phase under 35 U.S.C. § 371 of PCT International Application No. PCT/JP99/06090 which has an International filing date of Nov. 1, 1999, which designated the United States of America and was not published in English.

TECHNICAL FIELD

The present invention relates to a molded product and, more particularly, to a resin molded product.

BACKGROUND ART

Products molded from a resin material generally have excellent electrical insulation properties and, hence, are widely used in the field of electric and electronic components. However, elements of electric and electronic components molded from a resin material alone are liable to be electrostatically charged because of their high electrical insulation properties, thereby presenting such a problem that electronic components such as integrated circuits may be damaged due to adhesion of dust or electric discharge. Therefore, resin molded products for use in the field of semiconductor device production are typically imparted with a slight electrical conductivity by various methods.

One of the simplest methods for imparting the electrical conductivity to a resin molded product is to apply a solution of a surface active agent onto the resin molded product. In accordance with this method, however, a resin molded product produced in one step is subjected to the application of the surface active agent solution in another step, so that the step of applying the surface active agent solution is required in addition to the step of molding the resin material. Further, the electrical conductivity of the resin molded product obtained through this method is susceptible to the ambient humidity. That is, the resin molded product is likely to exhibit an intended level of electrical conductivity with its surface being kept in a readily humidified state (under highly humid conditions), but tends to fail to exhibit a required level of electrical conductivity with its surface being kept in a hardly humidified state (under dry conditions). Moreover, the surface active agent applied onto the resin molded product by this method is often absorbed into the molded product or removed therefrom by abrasion, so that reduction in the electrical conductivity with time is inevitable. Therefore, it is difficult for the resin molded product to retain the electrical conductivity for a long time. In addition, the removed surface active agent may cause contamination in a semiconductor device production process.

Instead of the aforesaid post-treatment of the resin molded product by the application of the surface active agent solution, an attempt has recently been made to initially impart the electrical conductivity to a resin molded product per se. More specifically, a conductivity imparting material is preliminarily blended in a resin material and the resulting resin material is molded into a desired shape for production of a conductive resin molded product. Generally used as the conductivity imparting material are antistatic agents such as a surface active agent and electrically conductive fillers such as of metal materials and carbon materials.

Where an antistatic agent such as a surface active agent is selected as the conductivity imparting material, the antistatic agent gradually migrates from the inside to the surface of the resin molded product, so that much time is required before the resin molded product exhibits an electrical conductivity. Since the effectiveness of the antistatic agent differs depending on the type of the resin material to be used, it is necessary to select a suitable antistatic agent for the resin material in consideration of the glass transition temperature and crystallinity of the resin material and the compatibility with the resin material. Further, the antistatic agent which has migrated to the surface of the resin molded product is often removed by abrasion as in the aforesaid solution application method, thereby possibly causing contamination in the semiconductor device production process.

In the case of the electrically conductive filler, on the other hand, the electrical conductivity can immediately be imparted to the resin molded product simply by blending a proper amount of the conductive filler in a resin material. Unlike the antistatic agent, there is no need to consider the combination between the conductive filler and the resin material (i.e., the conductive filler has a versatility with respect to various resin materials), so that the conductive filler can more easily and stably impart the conductivity to the resin molded product than the antistatic agent.

In the meantime, as a resin molded product containing an electrically conductive filler, Japanese Laid-open Patent Publication No. 63-53017 discloses a resin molded product which is obtained by molding a resin composition containing 64 to 80 vol % of a resin and 36 to 20 vol % of an electrically conductive substance, and which has attained a desired resistance by applying a voltage of not more than 1,000V. The electrically conductive substance used herein is a particulate or fibrous good electric conductor such as a metal, a metal oxide or a carbon, or a mixture thereof and, since its specific gravity is supposed to be generally larger than 1, the resin molded product is supposed to contain at least 20 wt % of the electrically conductive substance.

Further, Japanese Laid-open Patent Publication No. 62-110917 discloses an electrically conductive composite linear body, i.e. a resin molded product, in which a process employing a high voltage of not more than 10 kV is performed on a composite linear body obtained by disposing a covering layer of an insulating polymer on a linear body (core body) formed from a polymer (resin material) containing an electrically conductive substance. The electrically conductive substance as used herein is, for example, carbon black, and the amount of its use is, for example, 20 to 200 wt % with respect to the weight of the polymer.

However, the electrically conductive filler is generally more expensive than the resin material. For example, the prices in Japan of polypropylene resin and modified polyphenylene oxide resin, which are widely used for producing a resin molded product, are approximately 100 yen/kg and 1,000 yen/kg, respectively, at around the time of filing the present application, whereas the prices in the same period in Japan of pitch-based carbon fibers and carbon black used as an electrically conductive substance are approximately 3,000 yen/kg and 500 to 1,000 yen/kg, respectively. Therefore, since the resin molded products disclosed in the above-mentioned Publications each contain a large amount of an electrically conductive filler mixed with a resin material, the resin molded products will be extremely expensive though a desired electrical conductivity can be imparted. Particularly, where the resin molded product needs to be imparted with an electrical conductivity comparable to that of a metal for enhancement of electromagnetic shieldability, for example, a great amount of the conductive filler should be added to the resin material, so that the cost of the resin molded product is significantly increased. In this case, the conductive filler contained in a great amount in the resin molded product may deteriorate intrinsic properties of the resin molded product, and is liable to be released from the resin molded product to cause contamination.

Moreover, since the resin molded product disclosed in the above-mentioned Japanese Laid-open Patent Publication No. 63-53017 contains a large amount of the conductive filler, its color tone is strongly influenced by the color of the conductive filler. Particularly, since the resin molded product disclosed in the examples of the Publication contains a large amount of carbon fiber or graphite powder as the conductive filler, the color is inherently black and it is extremely difficult to freely impart a desired color to the resin molded product itself. In the meantime, since the resin molded product disclosed in Japanese Laid-open Patent Publication No. 62-110917 has a covering layer disposed on a core body for achieving a color that harmonizes with another non-conductive fibers, the resin molded product has a two-layer structure made of the core body and the covering layer, thereby providing a complex construction.

It is an object of the present invention to enhance the electrical conductivity of a resin molded product and, particularly, to reduce the surface resistance of the resin molded product, while reducing the amount of an electrically conductive filler to be added to the resin molded product.

It is another object of the present invention to realize a resin molded product exhibiting a high electrical conductivity, particularly a low surface resistance, though the amount of the added electrically conductive filler is reduced, and being imparted with a color.

DISCLOSURE OF THE INVENTION

A resin molded product according to the present invention comprises a matrix of a resin material and an electrically conductive filler dispersed in the matrix, wherein a content of the electrically conductive filler is lower than 20 wt %, and the resin molded product has been subjected to a voltage application process employing a voltage of not lower than 20 kV and lower than a dielectric breakdown voltage of the matrix. Here, the content of the electrically conductive filler is, for example, not lower than 1.0 wt % and not higher than 16 wt %. The electrically conductive filler as used herein has, for example, a collective filler electrical resistance of not more than $10^5$ $\Omega$cm and not less than $10^{-2}$ $\Omega$cm. The electrically conductive filler is, for example, fibrous. In this case, the electrically conductive filler has, for example, an average fiber diameter of not less than 0.002 $\mu$m and not more than 15 $\mu$m. The electrically conductive filler has, for example, an average residual aspect ratio of not less than 10 and not more than 100,000 in the resin molded product. The resin molded product according to the present invention further comprises, for example, a coloring material dispersed in the matrix together with the electrically conductive filler. In this case, the electrically conductive filler is at least one of a fibrous carbon filler and a fibrous graphite filler. Further, in this case, the resin molded product may further comprise a masking material for masking a color of the electrically conductive filler, the masking material being dispersed in the matrix together with the electrically conductive filler and the coloring material.

The resin molded product according to the present invention typically has a surface resistance of not less than $10^5$ $\Omega/\square$ and not more than $10^{12}$ $\Omega/\square$.

The resin molded product of the present invention, which has been subjected to the voltage application process employing a predetermined voltage, can exhibit a higher electrical conductivity and particularly a lower surface resistance than a resin molded product containing an equivalent amount of the conductive filler. In other words, the resin molded product can exhibit a higher level of electrical conductivity and particularly a lower level of surface resistance than those generally expected from the amount of the conductive filler contained therein. Further, the resin molded product, in which the content of the electrically conductive filler is reduced to the above-mentioned range, can exhibit a color corresponding to the color of a coloring material if the coloring material is dispersed in the matrix.

A resin molded product according to another aspect of the present invention comprises a matrix of a resin material and an electrically conductive filler dispersed in the matrix, wherein a content of the electrically conductive filler is lower than 20 wt %, and the surface resistance of the resin molded product after a heat treatment in which the resin molded product is heated up to a softening point of the resin material and then cooled to a room temperature, is not less than 100 times as great as that before the heat treatment. Here, the content of the electrically conductive filler is, for example, not lower than 1.0 wt % and not higher than 16 wt %. The surface resistance of the resin molded product after the resin molded product is subjected to the heat treatment and then to a voltage application process employing a voltage of not lower than 20 kV and lower than a dielectric breakdown voltage of the matrix, is typically not more than 1/100 of the surface resistance before the voltage application process.

The resin molded product further comprises, for example, a coloring material dispersed in the matrix together with the electrically conductive filler. In this case, the resin molded product may further comprise, for example, a masking material for masking a color of the electrically conductive filler, the masking material being dispersed in the matrix together with the electrically conductive filler and the coloring material.

The resin molded product according to this aspect has a lower surface resistance and can exhibit a higher electrical conductivity than other resin molded products containing an equivalent amount of the conductive filler. Further, the resin molded product, in which the amount of the added conductive filler is reduced to the above-mentioned range, can exhibit a color corresponding to the color of a coloring material if the coloring material is dispersed in the matrix.

A resin molded product producing method in accordance with the present invention comprises the steps of: preparing a molding material comprising a resin material and an electrically conductive filler so that a content of the electrically conductive filler is set to be lower than 20 wt %; molding the molding material into a predetermined shape; and applying a voltage of not lower than 20 kV and lower than a dielectric breakdown voltage of the resin material, to the molded material. Here, the content of the electrically conductive filler in the molding material is set to be, for example, not lower than 1.0 wt % and not higher than 16 wt %. The molding material further comprises, for example, a coloring material. In this case, the molding material may further comprise a masking material for masking a color of the electrically conductive filler.

The production method of the present invention, in which a predetermined voltage is applied to a molded material containing an electrically conductive filler, can realize a resin molded product exhibiting a higher electrical conductivity and particularly a lower surface resistance than other resin molded products which are produced through a conventional production method with the use of an equivalent amount of the conductive filler. Further, this method, in which the content of the conductive filler in the molding material is reduced to be lower than a predetermined amount, can impart a color corresponding to a coloring material to the resin molded product if the molding material contains the coloring material.

An apparatus according to the present invention is for producing a resin molded product containing an electrically conductive filler at a proportion of less than 20 wt % and having a surface resistance of not less than $10^5$ $\Omega/\square$ and not more than $10^{12}$ $\Omega/\square$, and comprises: a voltage application section for applying a voltage of not lower than 20 kV and lower than a dielectric breakdown voltage of a resin molded product containing the electrically conductive filler at a proportion of less than 20 wt %, to the resin molded product; and transport means for transporting the resin molded product toward the voltage application section.

An apparatus according to another aspect of the present invention is also for producing a resin molded product containing an electrically conductive filler at a proportion of less than 20 wt % and having a surface resistance of not less than $10^5$ $\Omega/\square$ and not more than $10^{12}$ $\Omega/\square$ and comprises: an electrode for applying a voltage of not lower than 20 kV and lower than a dielectric breakdown voltage of a resin molded product containing the electrically conductive filler at a proportion of less than 20 wt %, to the resin molded product; and transport means for transporting the resin molded product toward the electrode with the resin molded product being kept in an opposedly spaced relation with respect to the electrode, wherein the transport means is grounded.

Here, the electrode is, for example, an electrode set comprising a plurality of needle electrodes. In this case, the apparatus further comprises, for example, a spacing adjusting device for adjusting a spacing between the electrode and the resin molded product. In the meantime, the transport means is, for example, capable of successively transporting a multiplicity of resin molded products toward the electrode.

In the resin molded product producing apparatus according to the present invention, the resin molded product is transported toward the voltage application section by the transport means, and the predetermined voltage is applied to the resin molded product in the voltage application section. Therefore, the apparatus can increase the electrical conductivity of the resin molded product containing only a little conductive filler of less than a predetermined amount as mentioned above, thereby producing a resin molded product having a surface resistance of not less than $10^5$ $\Omega/\square$ and not more than $10^{12}$ $\Omega/\square$.

Other objects and effects of the present invention will become apparent from the following detailed description.

DETAILED DESCRIPTION OF THE INVENTION

A resin molded product of the present invention mainly comprises a matrix and an electrically conductive filler dispersed in the matrix.

The matrix is composed of a resin material and molded into a desired shape. The resin material to be herein used is not particularly limited, but any of known thermoplastic resins and thermoset resins may be used.

Examples of the thermoplastic resins include: general-purpose plastics such as polyethylene resins, polypropylene resins, polystyrene resins and polyacrylstyrene resins; engineering plastics such as acryl-butadiene-styrene resins (ABS), polyphenyl ether resins, polyacetal resins, polycarbonate resins, polybutylene terephthalate resins, polyethylene terephthalate resins, nylon 6 and nylon 6,6; and ultra engineering plastics such as polyether ether ketone resins, polyamide resins, polyimide resins, polysulfone resins, 4-fluoroethylene-ethylene copolymer resins, polyvinylidene fluoride resins, 4-fluoroethylene-perfluoroalkyl vinyl ether copolymer resins, polyether imide resins, polyether sulfone resins, polyphenylene sulfide resins, modified polyphenylene oxide resins, polyphenylene ether resins and liquid crystalline polymers. Examples of the thermoset resins include phenol resins, epoxy resins, polyimide resins and unsaturated polyester resins.

The electrically conductive filler dispersed in the matrix is typically useful to impart the resin molded product with electrical conductivity, and is a metal filler, a carbon filler, a metal-coated organic filler, a metal-coated inorganic filler, a carbon-coated inorganic filler or a graphite-coated inorganic filler, or a mixture of any two or more fillers selected from these fillers.

Examples of the metal filler include fillers composed of silver, copper, nickel, iron, aluminum, stainless steel and tin oxide. Examples of the carbon filler include fillers composed of carbon materials obtained by firing carbon precursors such as polyacrylonitrile resins, pitch, Kynol resins, rayon and lignin, carbon black, acetylene black, ketchen black and graphite. Examples of the metal-coated organic filler include nickel-coated resin fillers. Examples of the metal-coated inorganic filler include nickel-coated mica fillers, silver-coated glass fillers, aluminum-coated glass fillers, nickel-plated glass fillers and nickel-plated carbon fillers. Examples of the carbon-coated inorganic filler include carbon-coated potassium titanate fillers. Examples of the graphite-coated inorganic filler include graphite-coated potassium titanate fillers.

The aforesaid conductive filler may be in any one or more of various forms such as particulate form, flake form, whisker form and fibrous form, but the form thereof is not particularly limited. Examples of the particulate conductive filler include: silver powder, copper powder, nickel powder, iron powder and tin oxide powder as the metal filler; silver-coated glass beads as the metal-coated inorganic filler; and carbon black powder, acetylene black powder and ketchen black powder as the carbon filler. Examples of the flake conductive filler include aluminum flake and nickel-coated mica flake. Examples of the whisker conductive filler include carbon-coated potassium titanate whisker as the carbon-coated inorganic filler, and graphite whisker as the carbon filler. Examples of the fibrous conductive filler include: filaments and short fibers of aluminum, copper, stainless steel and the like as the metal filler; aluminum-coated glass fibers and nickel-plated glass fibers as the metal-coated inorganic filler; nickel-coated resin fibers as the metal-coated organic filler; and carbon fibers such as polyacrylonitrile-based carbon fibers, isotropic pitch-based carbon fibers, anisotropic pitch-based carbon fibers, Kynol resin-based carbon fibers, rayon-based carbon fibers and lignin-based carbon fibers, and graphite fibers as the carbon filler.

The electrically conductive filler to be used in the present invention preferably has a collective filler electrical resistance of not more than $10^5$ Ωcm and not less than $10^{-2}$ Ωcm, more preferably not more than $10^4$ Ω cm and not less than $10^{-2}$ Ωcm, because a smaller amount of its use can realize a desired electrical conductivity, particularly a low surface resistance, in a resin molded product. The term "collective filler electrical resistance" herein means the electrical resistance of a collective mass (bulk) of an electrically conductive filler contained in a resin molded product, but not the electrical resistance of each piece of the conductive filler. The collective filler electrical resistance is determined in the following manner. First, an electrically insulating body is prepared which has a 0.8-cm diameter through-hole formed in the center thereof, and one end of the through-hole is closed with a copper electrode. Then, 0.5 g of a collective conductive filler is filled in the through-hole, and a copper press rod is inserted into the through-hole from the other end thereof to press the collective conductive filler with a pressure of 20 kgf/cm$^2$, thereby forming an x-cm high filler cylinder. A measuring instrument is connected between the electrode and the press rod in this state to measure the electrical resistance of the collective conductive filler compressed in the through-hole. The collective filler electrical resistance is determined as a volume resistance (Ωcm) by dividing the product of the measured electrical resistance and the area of an end surface of the filler cylinder (i.e., $0.4^2$ πcm$^2$) by the height (X cm). The measuring instrument to be used for the measurement of the electrical resistance of the collective conductive filler is preferably of the type which is adapted to subtract a blank electrical resistance level, i.e., an electrical resistance level obtained when the electrode is kept in direct contact with the press rod, from a measurement. For example, a digital multimeter "R6552" of Advantest Co., Ltd. may be employed. The collective filler electrical resistance to be hereafter mentioned is the volume resistance of the assembly of a conductive filler determined in this manner.

The electrically conductive filler is preferably a fibrous filler, particularly an extremely fine fibrous filler having an average fiber diameter of not less than 0.002 μm and not more than 15 μm. Use of such a fibrous conductive filler can realize a desired electrical resistance, particularly a small surface resistance, in a resin molded product with a smaller amount of its use, and furthermore it is easier to freely impart a desired color, particularly a vivid color, to the resin molded product with the use of a later-mentioned coloring material. Here, if a super fine fibrous conductive filler having an average fiber diameter of not less than 0.002 μm and not more than 2 μm is used, it is easier to impart a vivid color to the resin molded product only with the use of the later-mentioned coloring material, i.e., without the use of a later-mentioned masking material, even if the conductive filler is a fibrous carbon filler or a fibrous graphite filler made of a black carbon material.

An example of a super fine fibrous conductive filler having an average fiber diameter of about 0.002 μm is "Hyperion" (the trade name of Hyperion Co., Ltd.) which is a kind of fibrous carbon.

If a fibrous filler such as mentioned above is used as the electrically conductive filler, the resin molded product of the present invention is preferably produced so that the average residual aspect ratio of the conductive filler is not less than 10 and not more than 100,000, more preferably not less than 15 and not more than 10,000. If the average residual aspect ratio becomes less than 10 in the production process of the resin molded product, there is a fear that a desired electrical conductivity, particularly a small surface resistance, cannot be attained unless the amount of the added conductive filler is increased. Conversely, it is generally difficult to produce a resin molded product having an average residual aspect ratio of the conductive filler exceeding 100,000. The residual aspect ratio herein means the aspect ratio (fiber length/fiber diameter) of the conductive filler after the conductive filler is mixed with the above-mentioned resin material and the resin material is molded, but not the aspect ratio of the conductive filler before the conductive filler is mixed with the resin material. Here, the residual aspect ratio can be determined, for example, by thermally decomposing the resin material constituting the resin molded product or dissolving the resin material in a solvent to separate the conductive filler from the resin molded product and measuring the average length and the average diameter of typically several hundred fibers in the conductive filler by means of an optical microscope or a scanning electron microscope.

The resin molded product of the present invention may further contain a coloring material dispersed in the matrix together with the above-mentioned conductive filler. The coloring material serves to impart a desired color to the resin molded product of the present invention, so that the kind of the coloring material is not particularly limited as long as it is non-conductive. The coloring material may be one of a variety of organic pigments and inorganic pigments. Examples of preferable organic pigments to be used include azo-based pigments such as naphthol red, condensed azo-yellow and condensed azo-red; phthalocyanine-based pigments such as copper phthalocyanine blue and copper phthalocyanine green; and condensed polycyclic pigments such as dianthraquinolyl red, thioindigo, perinone orange, perylene scarlet, quinacridone magenta, isoindolinone yellow, quinophthalone yellow and pyrrole red. Examples of preferable inorganic pigments to be used include oxide pigments such as zinc white, titanium oxide, red oxide, chrome oxide, cobalt green and cobalt blue; sulfide pigments such as cadmium yellow and cadmium red; silicate pigments such as ultramarine; carbonate pigments such as calcium carbonate; and phosphate pigments such as manganese violet. These coloring materials are preferably suitably selected for use in consideration of compatibility with the resin material to be utilized, and also these coloring materials may be suitably mixed for use so as to achieve a desired color.

If the above-mentioned coloring material is contained, the resin molded product of the present invention may further contain a masking material, which is dispersed in the matrix together with the conductive filler and the coloring material, for masking a color of the conductive filler. The masking material herein used serves to prevent the color of the resin molded product imparted by the coloring material from being affected by the color of the conductive filler, and to allow the resin molded product to exhibit a vivid color of the coloring material. The masking material is preferably non-conductive and has a white particulate form. Specifically, titanium oxide, mica, talc or calcium carbonate is used, for example.

In the resin molded product of the present invention, the content of the above-mentioned conductive filler is set to be less than 20 wt %, preferably not less than 0.01 wt % and less than 20 wt %, more preferably not less than 0.1 wt % and not more than 18 wt %, still more preferably not less than 1.0 wt % and not more than 16 wt %. If the content of the conductive filler is not less than 20 wt %, the costs of the resin molded product will be high and further the conductive filler may be released from the resin molded product to cause contamination. Moreover, the color of the resin molded product will be strongly influenced by the color of the conductive filler, so that it will be difficult to set the resin molded product to have a desired color corresponding to the color of the coloring material even if the masking material is used. Further, if the conductive filler is particulate, there is a fear that the mechanical strength of the resin molded product decreases. On the other hand, if the conductive filler is fibrous, the resin molded product is liable to be warped, and there is a fear that the surface roughness of the resin molded product will increase to deteriorate the surface smoothness.

The contents of the coloring material and the masking material in the matrix are not particularly limited, but may be properly defined in accordance with the chromaticity and brightness of the color to be imparted to the resin molded product. Preferably, the contents are typically defined so as not to deteriorate various properties of the resin molded product to be imparted by the resin material constituting the matrix. Specifically, the content of the coloring material is preferably set to be not less than 0.1 wt % and not more than 5.0 wt %, more preferably not less than 0.2 wt % and not more than 2.0 wt %, of the weight of the resin molded product. The content of the masking material is preferably set to be not less than 0.1 wt % and not more than 10 wt %, more preferably not less than 0.2 wt % and not more than 5.0 wt %, of the weight of the resin molded product.

Here, since titanium oxide used as the coloring material or the masking material can serve as a photooxidation catalyst, a resin molded product containing a large amount of titanium oxide is liable to be oxidized and deteriorated under radiation of light. Therefore, if titanium oxide is to be used as the coloring material or the masking material, the content thereof is preferably as small as possible, and is preferably limited to be about 0.1 to 2.0 wt % of the weight of the resin molded product.

The resin molded product of the present invention has been subjected to a voltage application process. This voltage application process is performed on the matrix composed of the above-mentioned molded resin material containing the conductive filler and optionally the coloring material and the masking material.

The voltage to be applied in this process is typically set to be not lower than 20 kV and lower than a dielectric breakdown voltage of the matrix of the resin molded product, i.e., the resin material constituting the matrix, preferably not lower than 20 kV and not higher than 50 kV. If the applied voltage is lower than 20 kV, the electrical conductivity of the resin molded product of the present invention may not be increased to a level greater than that expected from the content of the conductive filler. Further, even if the electrical conductivity can be increased, there will be a problem in its reproducibility. Conversely, if the voltage is not lower than the dielectric breakdown voltage of the matrix (resin material), the resin molded product may be broken. The level of the dielectric breakdown voltage, which is unique to each resin material, can be found in various handbooks for reference. The dielectric breakdown voltage levels listed in the handbooks are typically expressed in a unit of MV/m for 1-m thick products molded from resin materials, so that the dielectric breakdown voltage level is preferably calculated in accordance with the thickness of the resin molded product.

The period for this process is not particularly limited, but is typically about 1 to about 600 seconds, preferably about 5 to about 60 seconds. Even if the voltage is applied for more than 600 seconds, the electrical conductivity of the resin molded product cannot be increased to higher than a certain level, and such voltage application is uneconomical.

Next, an explanation will be given to a production method for the resin molded product in accordance with the present invention.

First, the resin material, the electrically conductive filler, and optionally the coloring material and the masking material are mixed together for preparation of a molding material. The mixing amount of the electrically conductive filler in the molding material is set to be less than 20 wt %, preferably not less than 0.01 wt % and less than 20 wt %, more preferably not less than 0.1 wt % and not more than 18 wt %, still more preferably not less than 1.0 wt % and not more than 16 wt %. If the coloring material is to be used, the mixing amount of the coloring material in the molding material is set to be not less than 0.1 wt % and not more than 5.0 wt %, preferably not less than 0.2 wt % and not more than 2.0 wt %. Further, if the masking material is to be used, the mixing amount of the masking material in the molding material is set to be not less than 0.1 wt % and not more than 10 wt %, preferably not less than 0.2 wt % and not more than 5.0 wt %.

The method of mixing the resin material and the conductive filler is not particularly limited. For example, the conductive filler may be supplied by means of any of various known feeders and the like, and blended with the resin material. At this time, the viscosity of the resin material may preliminarily be adjusted as required for enhancement of the dispersibility of the conductive filler.

If the molding material contains the coloring material and the masking material, these may be mixed with the resin material simultaneously with the electrically conductive filler by the aforementioned method. In this case, the coloring material and the masking material are dispersed in the resin material together with the electrically conductive filler so as to color the molding material to a color corresponding to the type of the utilized coloring material.

In turn, the resultant molding material is molded into a desired shape, e.g., in a plate form or a fibrous form, for production of the resin molded product. Any of various known molding methods such as pressure molding, injection molding and cast molding may be employed. Here, if the molding material contains the coloring material, the resin molded product obtained here exhibits a color corresponding to the utilized coloring material. Particularly, if the molding material contains the masking material, the resin molded product exhibits a vivid color corresponding to the utilized coloring material because the masking material masks the color of the electrically conductive filler effectively.

Then, the resultant resin molded product is subjected to the voltage application process. With the resin molded product being grounded, an electrode is positioned above the resin molded product, and an AC voltage or a DC voltage is applied to the electrode. Where the AC voltage is applied, a frequency of not higher than 1 MHz is likely to enhance an electrical conductivity improving effect and particularly a surface resistance reducing effect. On the other hand, where the DC voltage is applied, the polarity of the voltage to be applied to the electrode may be positive or negative, but a positive voltage is more likely to enhance the electrical conductivity improving effect and particularly the surface resistance reducing effect.

Figure 1:
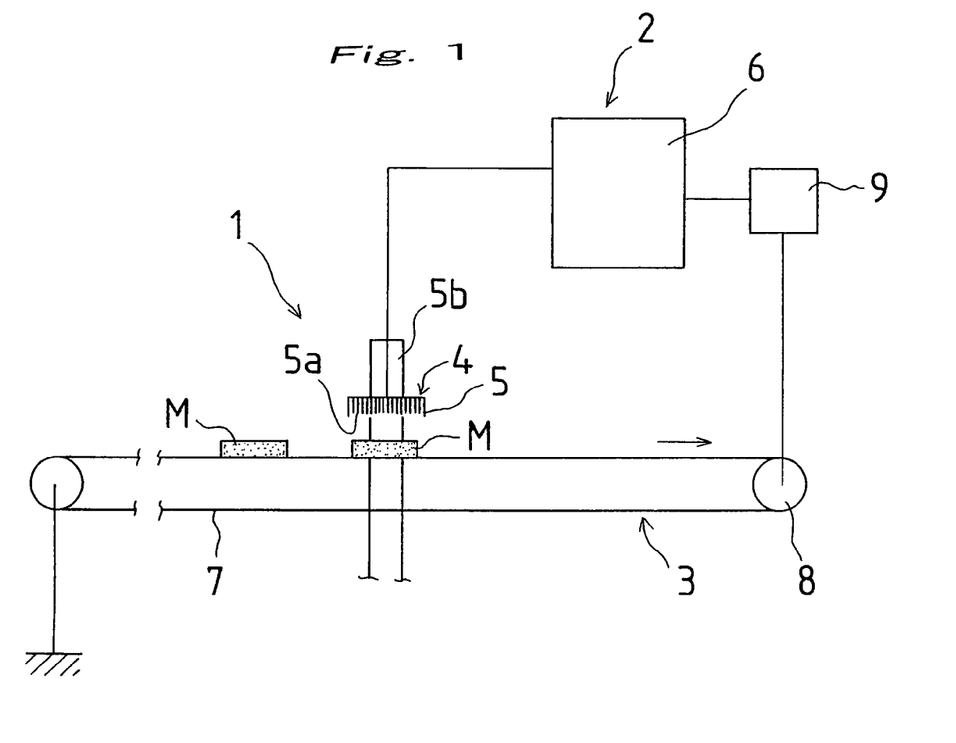
FIG. 1 is a schematic diagram illustrating the construction of a voltage application device to be employed for production of a resin molded product of the present invention.

FIG. 1 schematically illustrates the construction of one exemplary voltage application device to be herein used, i.e., a resin molded product processing apparatus according to the present invention. In FIG. 1, the voltage application device 1 mainly comprises a voltage application section 2, and a transport device 3 (i.e., transport means) for a resin molded product M.

The voltage application section 2 mainly comprises an electrode section 4 and a high voltage generator 6 connected to the electrode section 4. The electrode section 4 has a housing 5 opening toward the transport device 3, and an electrode set 5a including a plurality of needle electrodes projecting downward in the housing 5. The housing 5 can vertically be moved by means of an elevator 5b so that a spacing between the resin molded product M and a distal portion of the electrode set 5a is adjustable. An air suction device connected to an ozone remover not shown is provided in the housing 5.

The high voltage generator 6 is an AC or DC high voltage generator having an overcurrent preventing function, and incorporates a slidac or a thyristor regulator for adjusting a voltage level to be generated.

On the other hand, the transport device 3 is adapted to successively supply a multiplicity of resin molded products M to a lower side of the electrode section 4, and is comprised of a belt conveyor having an endless belt 7. The endless belt 7 is, for example, a metal belt or an electrically conductive resin belt, and grounded (earthed). The endless belt 7 is driven by a stepping motor 8 operative by a predetermined degree per unit time so as to be moved in an arrow direction in FIG. 1. The resin molded products M being transported are each stopped under the electrode section 4 for a predetermined period (typically about 1 to about 600 seconds, preferably about 5 to about 60 seconds). The operation timing of the stepping motor 8 is variably set in accordance with the time required for the voltage application process on the resin molded product M.

The stepping motor 8 is connected to the high voltage generator 6 of the voltage application section 2 via a controller 9. The controller 9 is adapted to send an electric signal (control signal) to the voltage application section 2 so as to actuate the high voltage generator 6 for the predetermined period when the stepping motor 8 transports the resin molded product M under the electrode section 4.

Where the voltage application process is carried out on the resin molded product M by means of the voltage application device 1, the high voltage generator 6 of the voltage application section 2 is first actuated, and the slidac or the thyristor regulator is operated to set the level of the voltage to be generated, i.e., the voltage to be applied to the resin molded product M. As mentioned before, the voltage to be set here is not lower than 20 kV and lower than a dielectric breakdown voltage of the resin material constituting the resin molded product M, preferably not lower than 20 kV and not higher than 50 kV.

The stepping motor 8 of the transport device 3 is operated to transport the multiplicity of resin molded products M placed on the endless belt 7 successively to the lower side of the electrode section 4. When one resin molded product M is transported to the lower side of the electrode section 4 by the operation of the stepping motor 8, the controller 9 sends an operation command to the high voltage generator 6. Thus, the voltage of the predetermined high level from the high voltage generator 6 is applied to the resin molded product M located under the electrode section 4 by the electrode set 5a for the predetermined period, i.e., during the quiescent period of the stepping motor 8. Ozone generated during the voltage application is sucked out of the housing 5 by the air suction device, and processed by the ozone remover.

When the stepping motor 8 is subsequently operated, the resin molded product M subjected to the voltage application process is transported outside the electrode section 4 (to the right in FIG. 1) by the endless belt 7, so that the next resin molded product M is in turn positioned under the electrode section 4. Thus, the voltage application device 1 performs the voltage application process successively on the multiplicity of resin molded products M.

In the voltage application process, it is preferred that the spacing between the distal portion of the electrode set 5a and the resin molded product M is properly set in accordance with the voltage application conditions, the level of the voltage to be applied, the type and shape of the resin molded product and the type and amount of the electrically conductive filler contained in the resin molded product by adjusting the vertical position of the housing 5 by means of the elevator 5b. Where a voltage of 30,000V is applied to the resin molded product in air, for example, the spacing is set in the range of 20 to 100 mm, preferably 30 to 50 mm. If the spacing is smaller than 20 mm, overcurrent is liable to occur. Conversely, if the spacing is greater than 100 mm, the effect of the voltage application process may be almost lost.

Although the aforesaid voltage application device 1 includes the multiplicity of needle electrodes as the electrode set 5a for the voltage application to the resin molded product M, the electrode set 5a may be such that a plurality of semicircular electrodes or a plurality of planar electrodes are arranged therein. Further, where a single planar electrode conformal to the shape (size) of the resin molded product M is provided instead of the electrode set 5a, the voltage application process can be achieved in the same manner.

In the aforesaid voltage application device 1, the voltage is applied to the resin molded product M from the electrode set 5a with the endless belt 7 being grounded. Alternatively, the present invention may be embodied with such an arrangement that the resin molded product M is transported on the endless belt 7 between a pair of planar electrodes or a pair of electrode sets with a plurality of needle electrodes connected to the high voltage generator 6 in non-contact therewith.

The high voltage generator 6 of the voltage application device 1 may be constituted by a high voltage pulse generator or an impulse voltage generator.

The resin molded product of the present invention obtained through the aforesaid process exhibits a higher level of electrical conductivity and particularly a lower level of surface resistance that can hardly be attained with the amount of the electrically conductive filler contained therein, compared with other resin molded products containing the conductive filler dispersed in the matrix of the resin material. In other words, the resin molded product of the present invention can exhibit a surface resistance within the range of not less than $10^5$ $\Omega/\square$ and not more than $10^{12}$ $\Omega/\square$ or a surface resistance within the range of not less than $10^{-2}$ $\Omega/\square$ and not more than $10^{13}$ $\Omega/\square$ which is generally required in the field of semiconductor device production, although the content of the electrically conductive filler is limited to be less than 20 wt %. More specifically, if a polyacrylonitrile-based carbon short fiber, for example, is used as the electrically conductive filler, the resin molded product can exhibit an electrical conductivity or a surface resistance equivalent to that of a resin molded product containing the conductive filler in an amount greater by several weight percent (typically about 3 to 5 wt %).

The electrical conductivity of a resin molded product generally increases with an increase in the probability of contact between pieces of the conductive filler. If the content of the conductive filler is smaller, the probability is reduced, making it more difficult for the resin molded product to exhibit the electrical conductivity. Nevertheless, the resin molded product of the present invention exhibits a higher electrical conductivity than the conventional resin molded products as described above. This is supposedly based on the following ground. In the resin molded product comprising the electrically conductive filler dispersed in the matrix of the resin material, a multiplicity of or an infinite number of capacitors are present which are each constituted by pieces of the conductive filler and a portion of the matrix (resin material) present therebetween. Since the resin molded product of the present invention has been subjected to the voltage application process, the matrix portion between the conductive filler pieces of each capacitor experiences dielectric breakdown. As a result, electric current flow paths are formed in the resin molded product, thereby increasing the electrical conductivity of the resin molded product.

For this reason, the resin molded product of the present invention, though containing the expensive conductive filler in a reduced amount, exhibits a higher level of electrical conductivity which can hardly be attained with such a reduced amount of the conductive filler. In other words, the resin molded product exhibits a higher level of electrical conductivity than that expected from the content of the conductive filler. Therefore, the resin molded product can be provided at lower costs than other resin molded products exhibiting a comparable electrical conductivity.

With such a unique effect, the resin molded product of the present invention can attain an electrical resistance level which the conventional resin molded products containing the conductive filler could hardly attain. Where carbon fibers are employed as the conductive filler, for example, the resultant resin molded product maintains electrically insulating properties with a surface resistance on the order of about $10^{14}$ to $10^{15}$ $\Omega/\square$ if the content of the conductive filler is up to a certain level. With the content of the conductive filler being greater than the certain level, however, a slight increase in the conductive filler content results in a remarkable increase in the electrical conductivity of the resin molded product (i.e., a remarkable decrease in the surface resistance). Therefore, it is known to be very difficult to adjust the surface resistance of the resin molded product at a level in the range of about $10^5$ to about $10^{12}$ $\Omega/\square$ which is generally required in the field of semiconductor device production. The resin molded product of the present invention, even if containing an electrically conductive filler such as carbon fibers which is liable to cause such a phenomenon, is allowed to have a high level of electrical conductivity simply by setting the amount of the conductive filler within a range where the electrical conductivity moderately varies with the amount of the conductive filler, and the conductivity level thereof is higher than that generally attained with that filler amount. Therefore, it is relatively easy to adjust the surface resistance of the resin molded product at a level on the order of about $10^5$ to $10^{12}$ $\Omega/\square$ or $10^{-2}$ to $10^{13}$ $\Omega/\square$.

Since the resin molded product of the present invention is imparted with the electrical conductivity by the addition of the electrically conductive filler as described above, the resin molded product can be used in various application fields in which prevention of electrostatic charge and dust adhesion is required, for example, for jigs, IC trays, carriers in semiconductor device production. In this case, since the resin molded product can be imparted with various colors by the coloring material as mentioned above, the intended use and the type of the resin molded product can be distinguished by the color. For example, a multiplicity of IC tray types having different surface resistances are sometimes prepared in accordance with the purpose of utilization. Since the color of the IC tray made of the resin molded product of the present invention can be varied for each type of the surface resistance, a needed IC tray can be easily distinguished from among the multiplicity of IC tray types on the basis of the color in the process of producing electric and electronic components.

Further, the resin molded product of the present invention can be recycled for reproduction of a similar resin molded product. Namely, when the resin molded product of the present invention is crushed and molded into a desired shape again and a voltage application process is performed under the conditions previously described, it can be reproduced into a similar resin molded product having a small surface resistance. Here, if the resin molded product is imparted with a color by the coloring material, a color similar to that can be reflected on the reproduced resin molded product. In contrast, a conventional resin molded product having been subjected to a voltage application process, particularly the resin molded product disclosed in Japanese Laid-open Patent Publication No. 62-110917, can hardly be reproduced into a similar resin molded product by recycling because it has a two-layer structure including a core body and a covering layer as mentioned before.

The aforesaid voltage application device 1 for use in the production of the resin molded product of the present invention can also be used for processing an existing resin molded product composed of a resin 43 material containing an electrically conductive filler in an amount of less than 20 wt %. In other words, the aforesaid voltage application process for the existing resin molded product with the use of the voltage application device 1 can be adapted for enhancement of the electrical conductivity of the existing resin molded product. In this case, the existing resin molded product is transported by the transport device 3, and is subjected to the voltage application process at the aforesaid voltage, i.e., not lower than 20 kV and lower than the dielectric breakdown voltage of the resin material constituting the resin molded product, preferably not lower than 20 kV and not higher than 50 kV, in the electrode section 4 of the voltage application section 2. As a result, the existing resin molded product is imparted with a higher electrical conductivity, particularly a lower surface resistance, than before the process.

The resin molded product of the present invention has substantially the same exterior appearance as the other resin molded products. Therefore, it is difficult to distinguish the resin molded products according to the present invention from the other resin molded products on the basis of their appearance, but the distinction from the other resin molded products may be made in the following manner.

(Method 1)

A thermogravimetric analysis is performed on a resin molded product whose surface resistance has been preliminarily measured, for determination of the amount and type of an electrically conductive filler contained in the resin molded product. If the amount of the electrically conductive filler determined on the basis of the result of the thermogravimetric analysis is less than 20 wt % and the surface resistance of the resin molded product preliminarily measured is at a level which cannot generally be attained with the amount of the conductive filler (i.e., at a lower level than that generally attained), it is judged that the resin molded product is the one according to the present invention.

For the thermogravimetric analysis on the resin molded product, the resin molded product is heated from the room temperature up to 1,000° C. at a temperature increase rate of about 10° C./min, and a change in the weight of the resin molded product during the heating is determined. Where the resin matrix leaves no carbon residue after the heating, the heating of the resin molded product for the thermogravimetric analysis may be carried out in an inert gas such as nitrogen.

Figure 2:
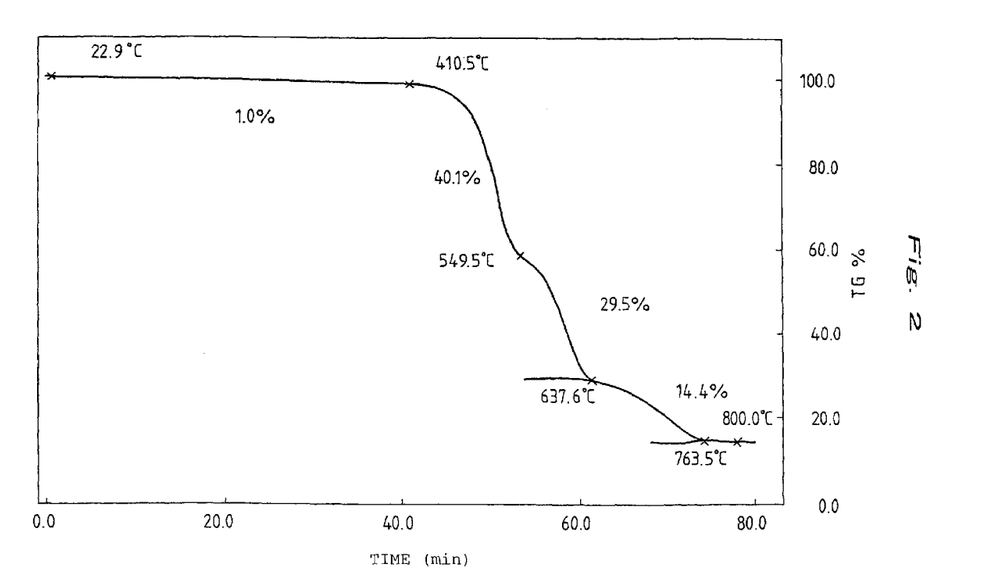
FIG. 2 is a diagram showing the result of a thermogravimetric analysis performed on one exemplary resin molded product.

FIG. 2 shows the result of the thermogravimetric analysis performed on a resin molded product which comprises a polysulfone resin (which leaves carbon residue after the heating), 15 wt % of carbon fibers and 15 wt % of a non-conductive inorganic substance and has a surface resistance of $1.4 \times 10^3$ $\Omega/\square$. Here, the non-conductive inorganic substance is a mixture of several kinds of inorganic substances including titanium oxide used as the masking material. Numerical values shown in percent in FIG. 2 each represent a weight reduction during a period between inflection points. In FIG. 2, a weight reduction of 14.4% is observed in a range between 637.6 to 763.5° C., and virtually agrees with the amount of the carbon fibers contained in the resin molded product. The residue at 800° C. is about 15%, which virtually agrees with the amount of the non-conductive inorganic substance contained in the resin molded product. The result of the thermogravimetric analysis shows that the resin molded product subjected to the analysis contains about 15 wt % of a carbonaceous conductive filler and about 15 wt % of a non-conductive inorganic substance.

A weight reduction of 29.5% observed in a range between 549.5 to 637.6° C. is attributed to carbonization of the polysulfone resin constituting the matrix of the resin molded product, and it is easily understood that the weight reduction is not attributed to the carbon fibers of the conductive filler because the combustion speed is much higher than the combustion speeds of the carbon fibers and other carbonaceous conductive fillers.

Where the electrically conductive filler contained in the resin molded product is metal-based, a weight increase will be observed due to oxidation of the conductive filler. Therefore, if such a weight increase is observed in the thermogravimetric analysis, the resin molded product supposedly contains a metal-based conductive filler.

This method may be carried out by employing ESCA (electron spectroscopy for chemical analysis) or EPMA (electron probe microanalyzer) instead of the thermogravimetric analysis for determination of the type and amount of the electrically conductive filler contained in the resin molded product.

(Method 2)

A resin molded product is heated to not lower than the softening point of a resin material constituting the resin molded product and then cooled to the room temperature, and the surface resistance of the resultant resin molded product is measured. The resin molded product of the present invention or the resin molded product processed through the processing method of the present invention exhibits a higher surface resistance after the heat treatment than before the heat treatment because dielectrically broken portions therein are recovered by the heat treatment. More specifically, the resin molded product of the present invention typically has a surface resistance higher by 100 or more times after the heat treatment than before the heat treatment. On the other hand, resin molded products not subjected to the voltage application process unlike the resin molded products according to the present invention do not have any dielectrically broken portions and, even if they are subjected to the aforesaid heat treatment, the surface resistance thereof will hardly be increased.

The resin molded product of the present invention, when being subjected to the aforesaid heat treatment and then to the voltage application process under the conditions previously described, can exhibit a surface resistance which is not more than $\frac{1}{100}$ of the surface resistance before the voltage application process.

(Method 3)

In the case where the resin molded product has a color other than black-based ones, the resin molded product may possibly be a resin molded product of the present invention if the color appears substantially uniformly over an entire cross section of the resin molded product and the surface resistance thereof is within a range of about $10^5$ to $10^{12}$ $\Omega/\square$ or $10^{-2}$ to $10^{13}$ $\Omega/\square$. Meanwhile, a resin molded product containing not less than 20 wt % of a carbonaceous conductive filler such as used in the present invention, exhibits a black color in its entirety and therefore, even if the resin molded product contains a coloring material, it cannot exhibit a color corresponding to the coloring material. Also, in the case where the color is imparted only on a surface portion of the resin molded product (for example, in the case of the aforementioned resin molded product disclosed in Japanese Laid-open Patent Publication No. 62-110917), a uniform color cannot appear over an entire cross section of the resin molded product.

(Method 4)

A resin molded product is sufficiently rinsed with acetone or water, and the levels of surface resistance before and after the rinsing are compared with each other.

In the case of the resin molded product of the present invention, the surface resistance hardly changes before and after the rinsing. In the case of the other resin molded product, particularly those treated with a surface active agent for impartation of the electrical conductivity, the surface resistance is remarkably increased after the rinsing. Therefore, whether or not a given resin molded product is the one according to the present invention can be judged by measuring the surface resistance thereof before and after the rinsing thereof.

The present invention will hereinafter be described in greater detail by way of examples thereof.

EXAMPLE 1

Polyacrylonitrile-based carbon short fibers (available under the trade name of "PYROFIL" from Mitsubishi Rayon Co., Ltd.) having an average fiber diameter of 7 μm, an average aspect ratio of 857 and a collective filler electrical resistance of 0.06 Ω cm were prepared as an electrically conductive filler.

Next, the aforesaid fibers, a yellow coloring material (available under the trade name of "CB116" from Toyo Kasei Co., Ltd.), titanium oxide (available under the trade name of "CR60" from Ishihara Sangyo Co., Ltd.) as a masking material, and talc (available under the trade name of "#1000" from Fuji Talc Co., Ltd.) were supplied into a polyphenylene oxide resin (available under the trade name of "NORYL PPO534" from Japan General Electric Co., Ltd.) as a resin material by means of a feeder, and mixed therewith for preparation of pellets (molding material) of the resin material containing the fibers, the coloring material and the masking material. The mixing proportion of the fibers was set to be 6.0 wt % based in the pellets. The mixing proportions of the coloring material, titanium oxide and talc were set to be 1.0 wt %, 0.2 wt % and 3.0 wt %, respectively. The pellets exhibited a yellow color owing to the coloring material.

The pellets were injection-molded into a yellow disk having a diameter of 50 mm and a thickness of 3 mm at a resin temperature of 240° C. and at a mold temperature of 60° C. with an injection pressure of 1,200 kg/cm$^2$ by means of a PROMAT injection molding machine of Sumitomo Jukikai Kogyo Co., Ltd. for production of a resin molded product. A pair of electrodes were formed from a silver paste on a surface of the resulting disk, and the surface resistance ($\Omega/\square$) of the disk was determined by measuring an electrical resistance between the electrodes. As a result, the surface resistance was $4 \times 10^{15}$ $\Omega/\square$. The surface resistance to be hereafter mentioned is the resistance determined in this manner.

The average residual aspect ratio of the polyacrylonitrile-based carbon fibers in the disk was 28.6. The average residual aspect ratio was determined by dissolving the disk in methylene chloride for separation of polyacrylonitrile-based carbon short fibers and measuring the average length and the average diameter of 400 fibers among the separated fibers by an optical microscope.

Subsequently, the obtained disk was placed on a grounded plate, and an electrode set comprising a multiplicity of needle electrodes was positioned above the disk. The plate was spaced 40 mm apart from the electrode set, so that the electrode set was not in direct contact with the disk. A DC voltage of 30,000V was applied to the electrode set as having a positive polarity for ten seconds. The disk subjected to the voltage application process in this manner (resin molded product according to the present invention) had a surface resistance of $1 \times 10^{12}$ $\Omega/\square$, which was much lower than that before the voltage application process. The color of the disk did not change even after the voltage application process.

Figure 3:
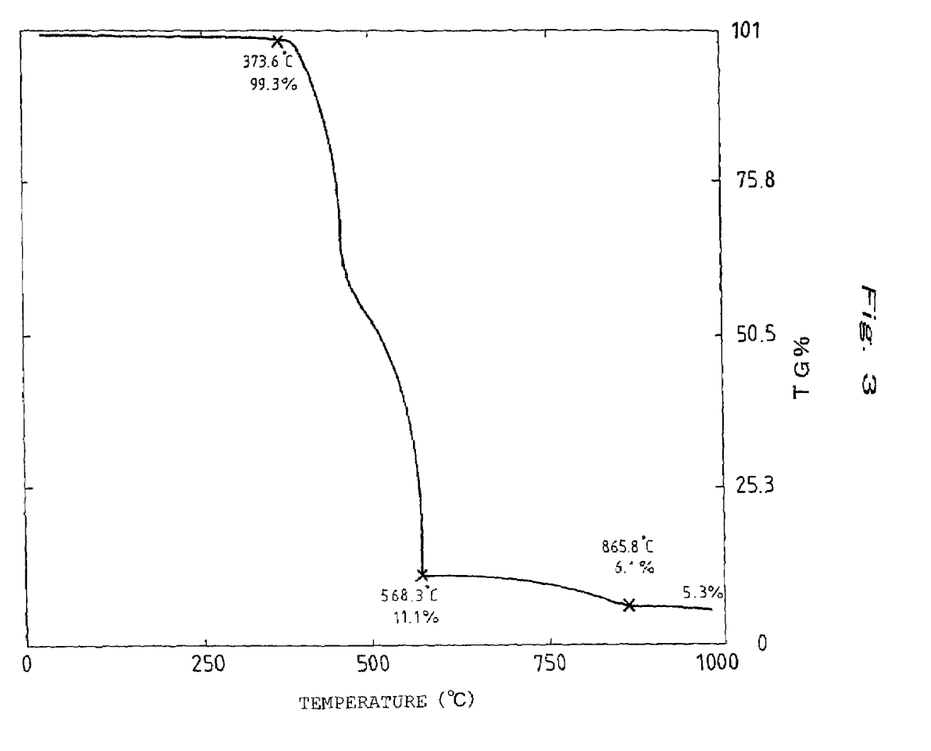
FIG. 3 is a diagram showing the result of a thermogravimetric analysis performed on a disk obtained in Example 1.

Further, a thermogravimetric analysis was performed on the disk. The result is shown in FIG. 3. The thermogravimetric analysis was performed by means of a thermogravimetric analyzer available under the trade name of "TG/DTA32" from Seiko Instrument Co., Ltd. in a measurement temperature range of 20 to 1,000° C. at a temperature increase rate of 10° C./min at an air flow rate of 200.0 ml/min, and numerical values shown in percent in FIG. 3 each represent a residual weight ratio. The result of the thermogravimetric analysis shows that the fibers were contained in a proportion of 5.8 wt % in the disk, which virtually agreed with the mixing proportion of the fibers used for the production of the disk. In addition, the result shows that a non-combustible residue was present at 5.3 wt %, which is supposed to be derived from the masking material or the like.

EXAMPLE 2

Polyacrylonitrile-based carbon short fibers (available under the trade name of "PYROFIL" from Mitsubishi Rayon Co., Ltd.) having an average fiber diameter of 7 µm, an average aspect ratio of 857 and a collective filler electrical resistance of 0.06 $\Omega$ cm, a yellow coloring material (available under the trade name of "CB116" from Toyo Kasei Co., Ltd.), titanium oxide (available under the trade name of "CR60" from Ishihara Sangyo Co., Ltd.) as a masking material, and mica (available under the trade name of "Kuraray Mica 200HK" from Kuraray Co., Ltd.), were mixed with a polypropylene resin (available under the trade name of "NOVATEC BC3B" from Japan Polychem Co., Ltd.) as a resin material in substantially the same manner as in Example 1 for preparation of pellets. The mixing proportion of the fibers was set to be 5.0 wt % in the pellets. The mixing proportions of the coloring material, titanium oxide and mica were set to be 0.6 wt %, 0.2 wt % and 1.0 wt %, respectively. The pellets exhibited a vivid yellow color owing to the coloring material.

A disk was produced from the thus obtained pellets through substantially the same molding process as in Example 1. The disk exhibited a vivid yellow color. The average residual aspect ratio of the polyacrylonitrile-based carbon short fibers in the disk was 51.1. The average residual aspect ratio was determined in substantially the same manner as in Example 1 except that hot decalin was used as the solvent for dissolving the disk.

The surface resistance of the thus obtained disk was measured before and after the voltage application process. The conditions for the voltage application process were set to be substantially the same as in Example 1 except that an AC voltage of 30 kV was applied. The surface resistance of the disk before the voltage application process was $2.6 \times 10^{14}$ $\Omega/\square$, whereas the surface resistance of the disk after the voltage application process showed a reduced value of $3.3 \times 10^5$ $\Omega/\square$. The color of the disk did not change even after the voltage application process.

Figure 4:
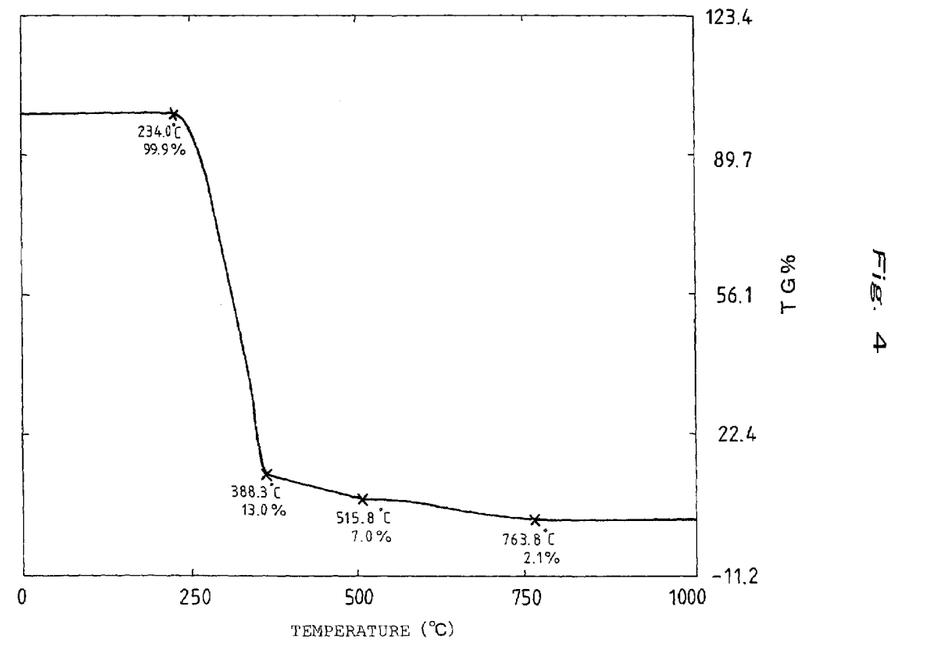
FIG. 4 is a diagram showing the result of a thermogravimetric analysis performed on a disk obtained in Example 2.

Further, a thermogravimetric analysis was performed on the disk before the voltage application process. The result is shown in FIG. 4. The thermogravimetric analysis was performed by means of a thermogravimetric analyzer available under the trade name of "TG/DTA32" from Seiko Instrument Co., Ltd. in a measurement temperature range of 20 to 1,000° C. at a temperature increase rate of 10° C./min at an air flow rate of 200.0 ml/min, and numerical values shown in percent in FIG. 4 each represent a residual weight ratio. The result of the thermogravimetric analysis in FIG. 4 shows that the fibers were contained in a proportion of 4.9 wt % in the disk, and it is understood that this virtually agrees with the mixing proportion of the fibers used for the production of the disk. In addition, the result shows that a non-combustible residue was present at 2.1 wt %, which is supposed to be derived from the masking material or the like.

EXAMPLE 3

A yellow disk was produced in substantially the same manner as in Example 2 except that the mixing proportions of the fibers and the coloring material were changed to 6.0 wt % and 1.0 wt %, respectively, and titanium oxide and mica were not used. The average residual aspect ratio of the polyacrylonitrile-based carbon short fibers in the disk was 52.3. After the surface resistance of the disk was measured, a voltage application process was performed on the disk under substantially the same conditions as in Example 2. The surface resistance of the disk before the voltage application process was $8 \times 10^{13}$ $\Omega/\square$, whereas the surface resistance of the disk after the voltage application process showed a reduced value of $4 \times 10^5$ $\Omega/\square$. The color of the disk did not change even after the voltage application process.

Figure 5:
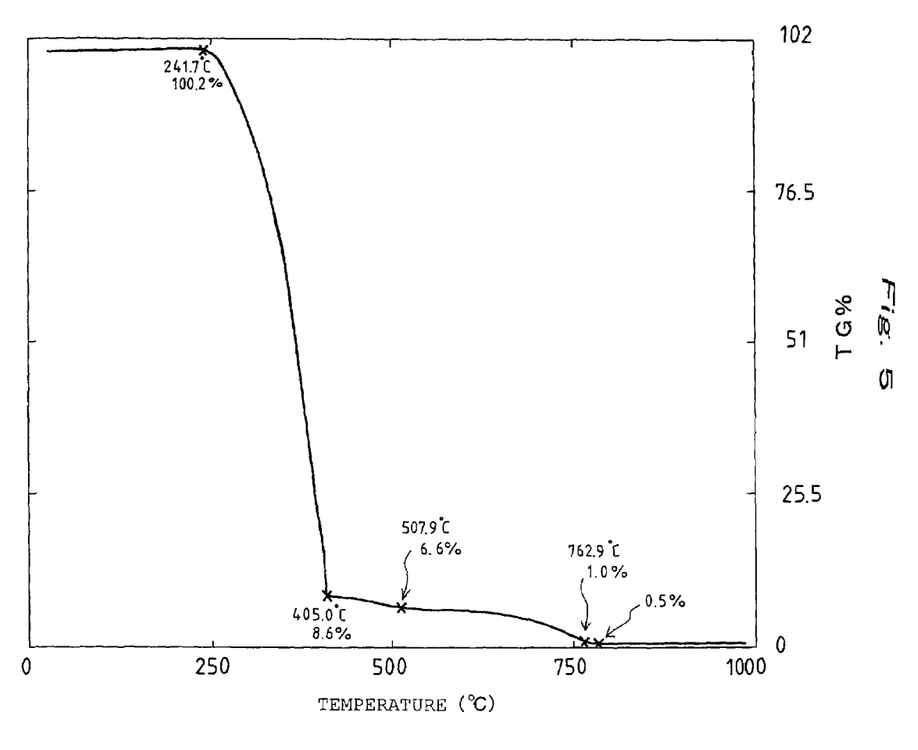
FIG. 5 is a diagram showing the result of a thermogravimetric analysis performed on a disk obtained in Example 3.

Further, a thermogravimetric analysis was performed on the disk before the voltage application process in substantially the same manner as in Example 2. The result is shown in FIG. 5. The result of the thermogravimetric analysis in FIG. 5 shows that the fibers were contained in a proportion of 6.1 wt % in the disk, and it is understood that this virtually agrees with the mixing proportion of the fibers used for the production of the disk. In addition, the result shows that a non-combustible residue was present at 0.5 wt %, which is supposed to be derived from impurities contained in the disk.

EXAMPLE 4

Pitch-based carbon short fibers (available under the trade name of "Xylus GCA03J431" from Osaka Gas Co., Ltd.) having an average fiber diameter of 12 μm, an average aspect ratio of 250 and a collective filler electrical resistance of 6080 Ωcm, a green coloring material (available under the trade name of "NO41" from Dainichi Seika Co., Ltd.), titanium oxide (available under the trade name of "CR60" from Ishihara Sangyo Co., Ltd.) as a masking material, and mica (available under the trade name of "Kuraray Mica 200HK" from Kuraray Co., Ltd.), were mixed with a polyphenylene oxide resin (available under the trade name of "NORYL PPO534" from Japan General Electric Co., Ltd.) as a resin material in substantially the same manner as in Example 1 for preparation of pellets. The mixing proportion of the fibers was set to be 16 wt % in the pellets. The mixing proportions of the coloring material, titanium oxide and mica were set to be 1.0 wt %, 1.0 wt % and 5.0 wt %, respectively. The pellets exhibited a green color owing A disk was produced from the thus obtained pellets through substantially the same molding process as in Example 1. The disk exhibited a green color owing to the coloring material. The average residual aspect ratio of the pitch-based carbon short fibers in the disk was 18.8. The average residual aspect ratio was determined in substantially the same manner as in Example 1. The surface resistance of the disk was measured before and after the voltage application process which was performed in substantially the same manner as in Example 1. The surface resistances of the disk before and after the voltage application process were $3 \times 10^{10}$ $\Omega/\square$ and $5 \times 10^8$ $\Omega/\square$ respectively. The color of the disk did not change even after the voltage application process.

EXAMPLES 5 TO 12

Polyacrylonitrile-based carbon short fibers (available under the trade name of "PYROFIL" from Mitsubishi Rayon Co., Ltd.) having an average fiber diameter of 7 μm, an average aspect ratio of 857 and a collective filler electrical resistance of 0.06 Ω cm, a red coloring material (available under the trade name of "CB328" from Toyo Kasei Co., Ltd.), titanium oxide (available under the trade name of "CR60" from Ishihara Sangyo Co., Ltd.) as a masking material, and talc (available under the trade name of "#1000" from Fuji Talc Co., Ltd.), were mixed with a polypropylene resin (available under the trade name of "NOVATEC BC3B" from Japan Polychem Co., Ltd.) as a resin material in substantially the same manner as in Example 1 for preparation of several types of pellets. The fibers were contained in the pellets in different proportions as shown in Table 1. The mixing proportions of the coloring material, titanium oxide and talc were set to be 1.0 wt %, 0.2 wt % and 3.0 wt %, respectively, in each of Examples 5 to 12.

Disks were produced from the thus obtained pellets through substantially the same molding process as in Example 1, and the surface resistances thereof were measured. Then, the disks thus obtained were subjected to the voltage application process under conditions as shown in Table 1, and the surface resistances thereof were measured. The conditions for the voltage application process shown in Table 1 are detailed below, and the results are shown in Table 1. The disk obtained in each of Examples 5 to 12 exhibited a vivid red color owing to the coloring material, and the color did not change even after the voltage application process.

(Conditions for Voltage Application Process)

Conditions A:

A pair of electrode sets each comprising a multiplicity of vertically extending needle electrodes were vertically spaced apart by 35 mm, and the lower electrode set was grounded. A disk was placed on the lower electrode set, and a DC voltage of +30 kv was applied between the electrode sets for 30 seconds.

Conditions B:

A pair of electrode sets each comprising a multiplicity of vertically extending needle electrodes were vertically spaced apart by 35 mm, and the lower electrode set was grounded. A disk was placed on the lower electrode set, and a DC voltage of −30 kv was applied between the electrode sets for 30 seconds.

Conditions C:

A pair of electrode sets each comprising a multiplicity of vertically extending needle electrodes were vertically spaced apart by 30 mm, and the lower electrode set was grounded. Several hollow cylindrical supports were vertically placed on the lower electrode set, and a disk was horizontally placed on the supports. With the disk being thus horizontally positioned between the pair of electrode sets, a DC voltage of +50 kV was applied between the electrode sets for 30 seconds.

Conditions D:

A pair of electrode sets each comprising a multiplicity of vertically extending needle electrodes were vertically spaced apart by 30 mm, and the lower electrode set was grounded. Several hollow cylindrical supports were vertically placed on the lower electrode set, and a disk was horizontally placed on the supports. With the disk being thus horizontally positioned between the pair of electrode sets, a DC voltage of −50 kV was applied between the electrode sets for 30 seconds.

TABLE 1

| | | | Surface resistance ($\Omega/\square$) | |
| --- | --- | --- | --- | --- |
| Example | Mixing proportion of fibers (wt %) | Voltage application conditions | Before voltage application | After voltage application |
| 5 | 3.1 | A | $10^{15}$ | $1.7 \times 10^6$ |
| 6 | 3.1 | B | $10^{15}$ | $4.9 \times 10^{13}$ |
| 7 | 3.1 | C | $10^{15}$ | $3.4 \times 10^6$ |
| 8 | 3.75 | C | $4.0 \times 10^{14}$ | $4.3 \times 10^5$ |
| 9 | 4.4 | C | $8.0 \times 10^{13}$ | $9.6 \times 10^4$ |

TABLE 1-continued

| Example | Mixing proportion of fibers (wt %) | Voltage application conditions | Surface resistance ($\Omega/\square$) Before voltage application | Surface resistance ($\Omega/\square$) After voltage application |
| --- | --- | --- | --- | --- |
| 10 | 3.1 | D | $10^{15}$ | $9.9 \times 10^{12}$ |
| 11 | 3.75 | D | $4.0 \times 10^{14}$ | $1.7 \times 10^{6}$ |
| 12 | 4.4 | D | $8.0 \times 10^{13}$ | less than $10^{4}$ |

EXAMPLE 13

With respect to the disk obtained after the voltage application process in Example 2, the surface resistance thereof after a heat treatment was examined. Here, a heating-cooling cycle including the steps of heating the disk at a temperature shown in Table 2 for 30 minutes and then cooling the disk to a room temperature in 10 minutes, was performed four times for each temperature, and thereafter the surface resistance was measured. The results are shown in Table 2. If the heat treatment temperature was within the range of 95 to 165° C., the surface resistance of the disk after the heat treatment was approximately the same as that before the heat treatment, showing no great change in the surface resistance. However, it will be understood that, after the disk was subjected to a heat treatment at 175° C. which is a softening point of the resin used in Example 2, the surface resistance rose greatly to a level observed before the voltage application process.

TABLE 2

| | | Surface resistance ($\Omega/\square$) |
| --- | --- | --- |
| Before heat treatment | Before voltage application | $2.6 \times 10^{14}$ |
| | After voltage application | $3.3 \times 10^{5}$ |
| Heating temperature (° C.) | 95 | $2.5 \times 10^{5}$ |
| | 115 | $1.9 \times 10^{5}$ |
| | 125 | $2.0 \times 10^{5}$ |
| | 130 | $1.9 \times 10^{5}$ |
| | 135 | $2.2 \times 10^{5}$ |
| | 145 | $2.9 \times 10^{5}$ |
| | 155 | $2.4 \times 10^{5}$ |
| | 165 | $1.5 \times 10^{5}$ |
| | 175 | $1.0 \times 10^{14}$ |

EXAMPLE 14

Figure 6:
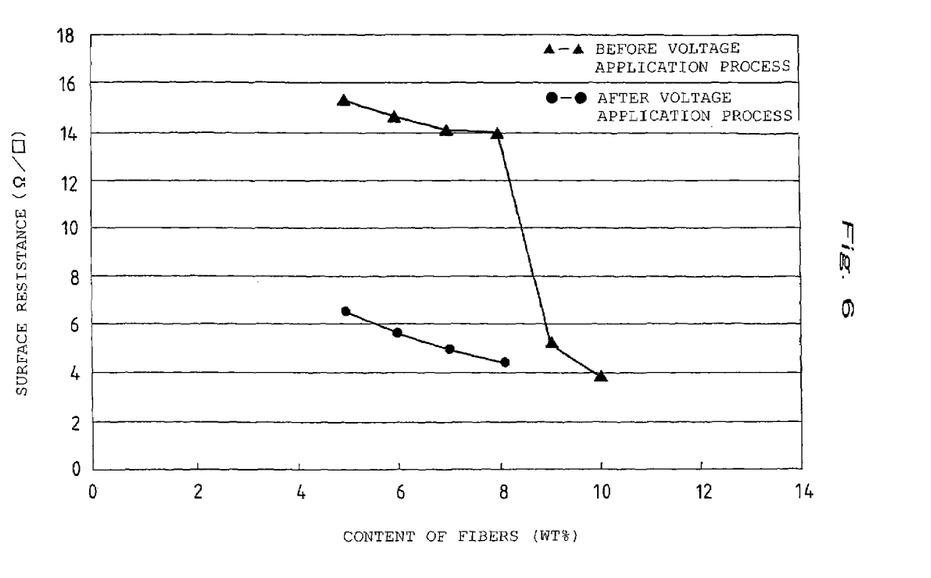
FIG. 6 is a graph showing relationships between the content of fibers and the surface resistance of disks obtained in Example 14 before and after a voltage application process.

Disks were produced in substantially the same manner as in Example 2 using only the polypropylene resin and the fibers used in Example 2. Here, six types of disks were produced in which the content of the fibers was respectively set to be 5 wt %, 6 wt %, 7 wt %, 8 wt %, 9 wt % and 10 wt %. The surface resistance of each disk was measured, and the results are shown in FIG. 6.

Next, a voltage application process similar to the one in Example 2 was performed on each of the disks in which the content of the fibers had been respectively set to be 5 wt %, 6 wt %, 7 wt % and 8 wt %, and thereafter the surface resistance thereof was measured. The results are shown in FIG. 6.

COMPARATIVE EXAMPLE 1

Pellets were prepared in substantially the same manner as in Example 1 except that the mixing proportions of the fibers, the coloring material and titanium oxide were changed to 20 wt %, 3.0 wt % and 1.0 wt %, respectively, in Example 1 and 5.0 wt % of mica (available under the trade name of "Kuraray Mica 200HK" from Kuraray Co., Ltd.) was utilized instead of talc. A disk was produced in substantially the same manner as in Example 1 with the use of these pellets. The resultant disk exhibited a dark gray color without reflection of the color of the coloring material added to the pellets. Further, the disk already showed a surface resistance of $2.0 \times 10^{2}$ $\Omega/\square$ even before the voltage application process.

COMPARATIVE EXAMPLE 2

Pellets were prepared by mixing 67 wt % of the polypropylene resin used in Example 2, 20 wt % of carbon black (available under the trade name of "Ketchen Black EC" from Akzo Co., Ltd.), 3.0 wt % of a red coloring material (available under the trade name of "CB328" from Toyo Kasei Co., Ltd.), 5.0 wt % of titanium oxide (available under the trade name of "CR60" from Ishihara Sangyo Co., Ltd.) and 5.0 wt % of talc (available under the trade name of "#1000" from Fuji Talc Co., Ltd.) in substantially the same manner as in Example 1. A disk was produced in substantially the same manner as in Example 1 with the use of these pellets. The resultant disk was black without reflection of the color of the coloring material. Further, the disk already showed a surface resistance of 4 $\Omega/\square$ even before the voltage application process.

The present invention may be embodied in any other ways without departing from the spirit or principal features thereof. Therefore, the examples described above are merely illustrative of the invention but not limitative of the same in any aspects. The scope of the invention is defined by the following claims and in no way limited by the description herein set forth. Further, any alterations and modifications made within the range of equivalents of the claims are intended to fall within the scope of the invention.

The invention claimed is:

1. A resin molded product comprising:
   a matrix of a resin material; and
   an electrically conductive filler dispersed in the matrix,
   wherein a content of the electrically conductive filler is lower than 20 wt %, and
   the resin molded product has been subjected to a voltage treatment with the use of an electrode employing a voltage of not lower than 20 kV and lower than a dielectric breakdown voltage of the matrix.

2. A resin molded product as set forth in claim 1, wherein the content of the electrically conductive filler is not lower than 1.0 wt % and not higher than 16 wt %.

3. A resin molded product as set forth in claim 1, wherein the electrically conductive filler has a collective filler electrical resistance of not more than $10^{5}$ $\Omega$cm and not less than $10^{-2}$ $\Omega$cm.

4. A resin molded product as set forth in claim 1, wherein the electrically conductive filler is fibrous.

5. A resin molded product as set forth in claim 4, wherein the electrically conductive filler has an average fiber diameter of not less than 0.002 μm and not more than 15 μm.

6. A resin molded product as set forth in claim 5, wherein the electrically conductive filler has an average residual aspect ratio of not less than 10 and not more than 100,000.

7. A resin molded product as set forth in claim 1, further comprising a coloring material dispersed in the matrix together with the electrically conductive filler.

8. A resin molded product as set forth in claim 7, wherein the electrically conductive filler is at least one of a fibrous carbon filler and a fibrous graphite filler.

9. A resin molded product as set forth in claim 8, further comprising a masking material for masking a color of the electrically conductive filler, the masking material being dispersed in the matrix together with the electrically conductive filler and the coloring material.

10. A resin molded product as set forth in claim 1, which has a surface resistance of not less than $10^5$ Ω/□ and not more than $10^{12}$ Ω/□.

11. A resin molded product as set forth in claim 1,
wherein the surface resistance of the resin molded product after a heat treatment in which the resin molded product is heated up to a softening point of the resin material and then cooled to room temperature, is not less than 100 times as great as that before the heat treatment.

12. A resin molded product as set forth in claim 11, wherein the content of the electrically conductive filler is not lower than 1.0 wt % and not higher than 16 wt %.

13. A resin molded product as set forth in claim 11, wherein the surface resistance of the resin molded product after the resin molded product is subjected to the heat treatment and then to a voltage treatment with the use of an electrode employing a voltage of not lower than 20 kV and lower than a dielectric breakdown voltage of the matrix, is not more than 1/100 of the surface resistance before the voltage treatment.

14. A resin molded product as set forth in claim 13, further comprising a coloring material dispersed in the matrix together with the electrically conductive filler.

15. A resin molded product as set forth in claim 14, further comprising a masking material for masking a color of the electrically conductive filler, the masking material being dispersed in the matrix together with the electrically conductive filler and the coloring material.

16. A resin molded product producing method comprising the steps of:
preparing a molding material comprising a resin material and an electrically conductive filler so that a content of the electrically conductive filler is set to be lower than 20 wt %;
molding the molding material into a predetermined shape; and
applying a voltage of not lower than 20 kV and lower than a dielectric breakdown voltage of the resin material, to the molded material with the use of an electrode.

17. A resin molded product producing method as set forth in claim 16, wherein the content of the electrically conductive filler in the molding material is set to be not lower than 1.0 wt % and not higher than 16 wt %.

18. A resin molded product producing method as set forth in claim 16, wherein the molding material further comprises a coloring material.

19. A resin molded product producing method as set forth in claim 18, wherein the molding material further comprises a masking material for masking a color of the electrically conductive filler.

20. An apparatus for producing a resin molded product containing an electrically conductive filler at a proportion of less than 20 wt % and having a surface resistance of not less than $10^5$ Ω/□ and not more than $10^{12}$ Ω/□, the apparatus comprising:
an electrode for applying a voltage of not lower than 20 kV and lower than a dielectric breakdown voltage of the resin molded product containing the electrically conductive filler at a proportion of less than 20 wt %, to the resin molded product; and
transport means for transporting the resin molded product toward the electrode with the resin molded product being kept in an opposedly spaced relation with respect to the electrode,
wherein the transport means is grounded, and wherein the electrode is an electrode set comprising a plurality of needle electrodes.

21. An apparatus as set forth in claim 20, further comprising a spacing adjusting device for adjusting a spacing between the electrode and the resin molded product.

22. An apparatus as set forth in claim 20, wherein the transport means is capable of successively transporting a multiplicity of resin molded products toward the electrode.

* * * * *